Jan. 12, 1932.  L. D. BAIRD  1,840,382
WRIST PIN PULLER
Filed Jan. 20, 1930
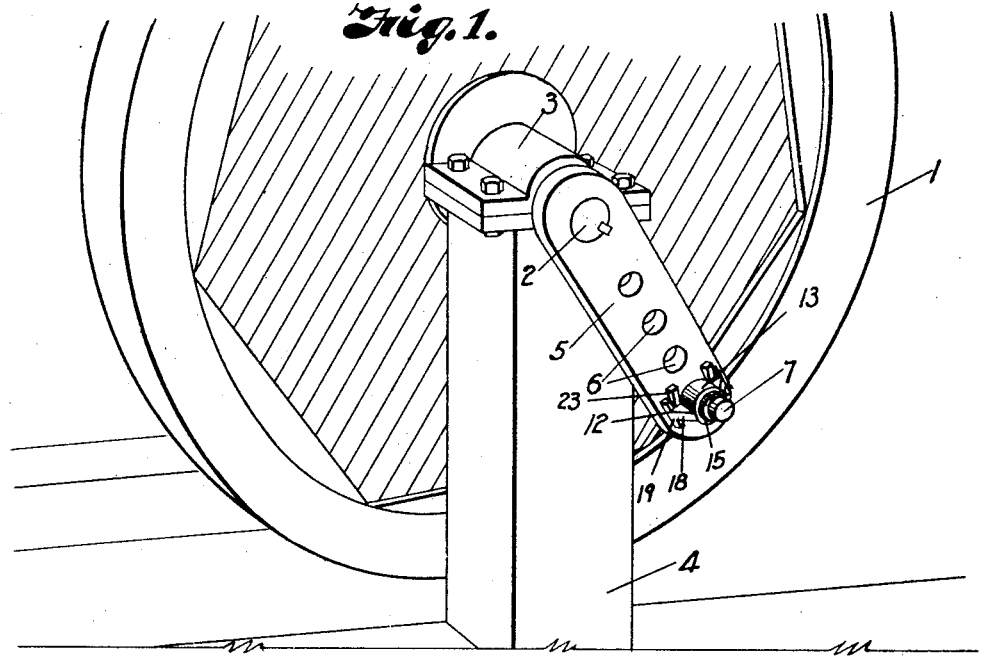
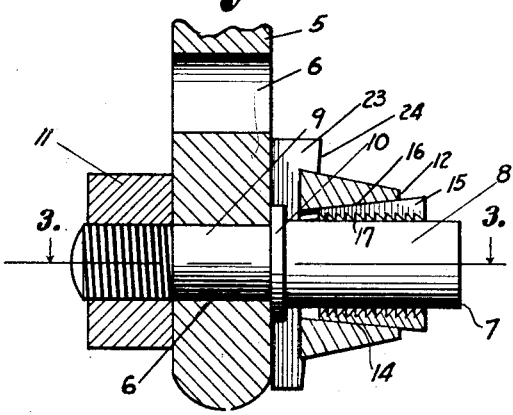
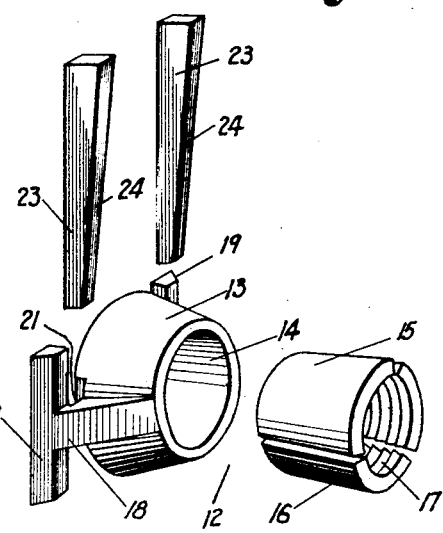
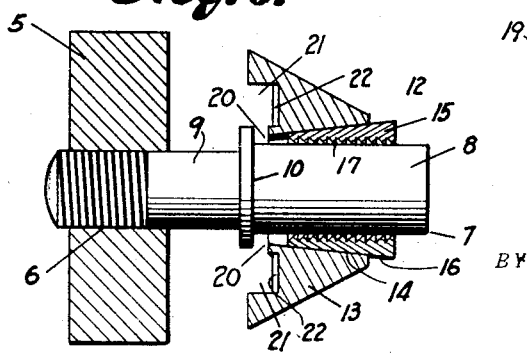
INVENTOR
Lynne D. Baird
Arthur C. Brown
ATTORNEY Patented Jan. 12, 1932

1,840,382

UNITED STATES PATENT OFFICE

LYNNE D. BAIRD, OF TULSA, OKLAHOMA

WRIST PIN PULLER

Application filed January 20, 1930. Serial No. 421,982.

My invention relates to pulling devices, and more particularly to pullers for removing wrist pins from cranks used in well drilling and pumping equipment.

In drilling and pumping oil wells, power transmitted to a bull wheel is changed from rotary to reciprocatory motion by a crank and pitman for operating a walking beam.

It is frequently necessary to vary the length of stroke of the walking beam and for this purpose a radial series of openings are provided in the crank to be selectively used for receiving the wrist pin. Due to the very close fit of the pin in said openings, imperative for smooth operation of the apparatus, it is difficult to remove the pin for changing the stroke of the walking beam and it is the principal object of my invention to provide a device for readily pulling a pin from a wrist pin opening.

A further object is to so construct a device of this character that it may be easily removed from the wrist pin after the pulling operation.

In accomplishing these and other objects of my invention, I have provided improved details of structure, the preferred form of which is illustrated in the accompanying drawings, wherein:

Fig. 1 is a perspective view of a wrist pin puller embodying my invention, and illustrated as applied to a crank and pin for the pulling operation.

Fig. 2 is a central section of the wrist pin puller and lower end of the crank, the wrist pin being shown in elevation.

Fig. 3 is a cross section on the line 3—3, Fig. 2, illustrating the wrist pin as being partially withdrawn from the crank.

Fig. 4 is a detail perspective view of the wrist pin puller in disassembled condition.

Referring more in detail to the drawings:

1 designates a bull wheel mounted on a crank shaft 2 journaled in bearings 3 on the upper ends of jack posts 4. Keyed to one end of the crank shaft is a crank 5 provided with a radial series of wrist pin openings 6 for selectively receiving a wrist pin 7 for operable connection with a walking beam (not shown). The wrist pin is formed to provide a pitman bearing portion 8 at one end, and an attaching shank 9 at its other end adapted for snug projection through one of the crank openings 6, the end portions being separated by a collar flange 10, for limiting projection of the pin with the outer end of the shank 9 being screw-threaded to receive a nut 11 for drawing the flange 10 firmly against the outer face of the crank.

The wrist pin puller, generally designated 12, includes a conical collar 13 having an inwardly tapering opening 14 for receiving a set of slips 15 having outer walls 16 tapered complementary to the inner surface of the collar, and toothed on their inner surfaces 17 to grip the bearing portion of the pitman bearing portion of the pin when the puller is applied to the pin as presently described.

The collar is further provided with brackets 18 terminating in T-shaped foot portions 19 extending inwardly beyond the inner face of the collar so that when the foot portions engage the outer face of the crank, a space indicated at 20 will be reserved between the collar and the flange 10 for a purpose later described.

Notches 21 having tapering walls 22 comprising wedge seats are provided in the collar adjacent each side of the bearing portion 8 to cooperate with wedge members 23 having correspondingly tapering walls 24 to engage the walls 22 of the collar.

When the puller, constructed as described, is to be operated for removing a wrist pin from a crank, the nut is removed from the pin and the collar mounted on the bearing end of the pin with the foot portions seated against the face of the crank and spacing the collar from the crank. The slips 15 are then mounted on the bearing end 8 within the opening 14 of the collar and driven forwardly until they firmly engage the surface of the pin.

The wedge members are then inserted in the notches 21 and are driven downwardly to withdraw the pin from the wrist pin opening 6. After the wrist pin has been removed from the crank, the collar and slips may be readily dislodged by driving the collar inwardly toward the flange on the wrist pin, this inward movement being made possible by the provision of the space reserved between the collar and the flange 10.

What I claim and desire to secure by Letters Patent is:

1. A wrist pin puller including a collar having a tapered bore, a bracket on the collar including a foot portion extended beyond the inner end of the collar and a wedge seat in the bracket adjacent the foot portion, slips seatable in the collar bore, and a wedge member cooperative with the wedge seat.

2. A wrist pin puller including a collar having a tapered bore, brackets on opposite sides of the collar having foot portions extended beyond the inner end of the collar, wedge seats in the brackets, slips seatable in the collar bore, and wedge members cooperative with said seats.

3. A wrist pin puller including a collar having a tapered bore, brackets on opposite sides of the collar having foot portions extended beyond the inner end of the collar, wedge seats in the brackets and in the inner end of the collar, slips seatable in the collar bore, and wedge members cooperative with said seats.

4. In a wrist pin puller for a wrist pin having an outer bearing portion, an inner shank adapted for projection into a crank arm and an intermediate collar adapted for bearing against the face of the crank arm, a collar on the puller having a tapered bore adapted for projection over said bearing portion, brackets on opposite sides of the collar having foot portions projected beyond the inner end of the collar to engage the crank arm and space the collar therefrom, the brackets and collar being cut away to provide wedge seats outwardly of the foot pieces, tapered slips seatable in the collar about the bearing portion of the pin, and wedge members engageable in said seats and with the crank to drive the pin from the crank.

In testimony whereof I affix my signature.

LYNNE D. BAIRD.